(No Model.)  
F. HIXSON.  
CORN HARVESTER.

No. 595,477.  
Patented Dec. 14, 1897.

2 Sheets—Sheet 1.

WITNESSES:  
Edward Thorpe

INVENTOR  
F. Hixson  
BY  
ATTORNEYS.

(No Model.) 2 Sheets—Sheet 2.

F. HIXSON.
CORN HARVESTER.

No. 595,477. Patented Dec. 14, 1897.

WITNESSES:
Edward Thorpe
[signature]

INVENTOR
F. Hixson.
BY [signature]
ATTORNEYS.

UNITED STATES PATENT OFFICE.

FRANK HIXSON, OF ASHLAND, OHIO.

CORN-HARVESTER.

SPECIFICATION forming part of Letters Patent No. 595,477, dated December 14, 1897.

Application filed May 7, 1897. Serial No. 635,460. (No model.)

*To all whom it may concern:*

Be it known that I, FRANK HIXSON, of Ashland, in the county of Ashland and State of Ohio, have invented a new and Improved Corn-Harvester, of which the following is a full, clear, and exact description.

The object of my invention is to provide a corn-harvester which will be simple, durable, and economic and upon which the cornstalks as cut may be piled so as to form a shock of predetermined dimensions, and whereby also the said shock may be expeditiously and conveniently lifted from the machine and deposited on the ground in such manner that the shock will maintain an upright position, thereby bringing the shocks close together and facilitating sowing the field with wheat, and likewise greatly facilitating the work of husking and setting up fodder.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
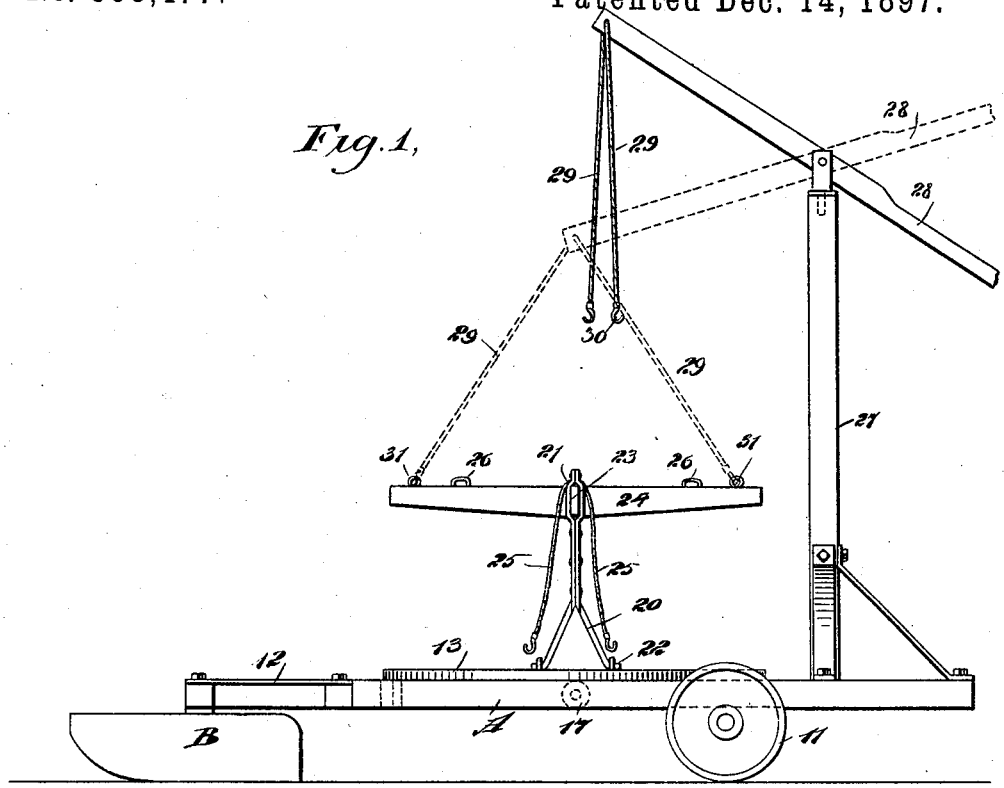
Figure 2:
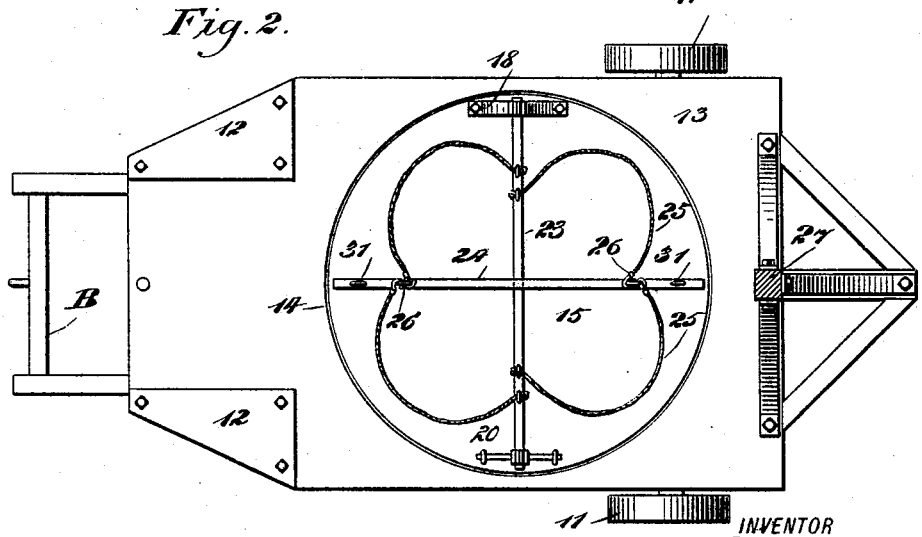

Figure 1 is a side elevation of the improved harvester. Fig. 2 is a plan view thereof, the standard carrying the hoisting-lever being in horizontal section; and Fig. 3 is a vertical section taken transversely through the machine at a point near the center.

In carrying out the invention a frame A, of any desired shape and of any approved material, is preferably mounted at the rear upon an axle 10, provided with ground-wheels 11, of suitable size, and while the front of the frame is shown as pivotally attached to a sled, an axle and wheels may be substituted for the sled, if found desirable.

A platform 13 is fixedly secured upon the frame, and at the front of the platform at each side the said platform is cut away to receive knives 12, the outer side edges whereof are the cutting edges, and the said knives are substantially triangular in shape, their cutting edges being inclined in opposite directions. In the fixed platform 13 an opening 14 is made, and within this opening a revoluble platform 15 is placed, a pivot-pin 16, which is located at the center, being clearly shown in Fig. 3. The revoluble platform 15 is held to turn, preferably, on rollers 17, which are secured to the fixed platform, being suitably grouped around the opening 14 in the latter.

Figure 3:
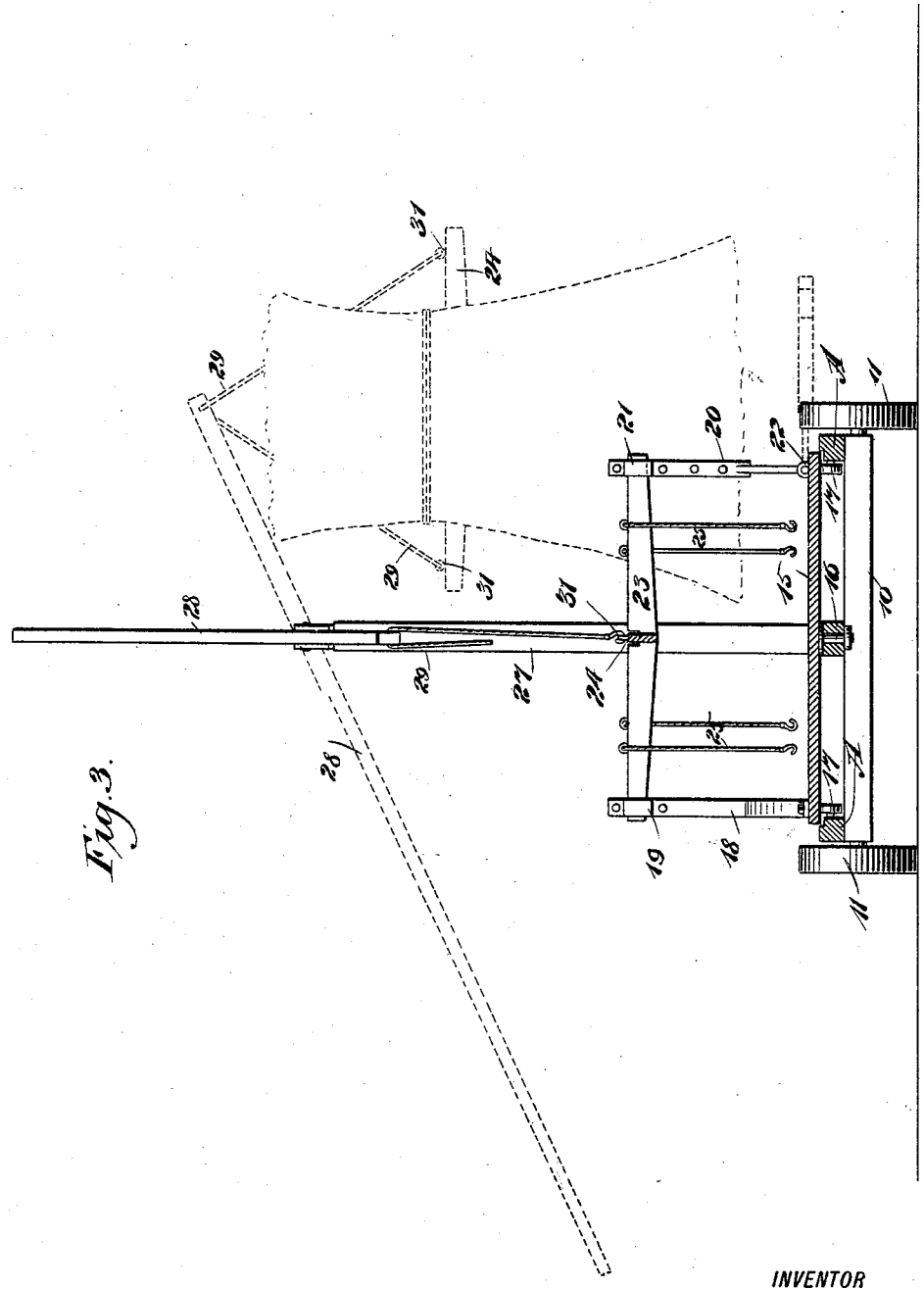

On the revoluble platform at one of its sides an upright 18 is firmly secured, terminating at the top in an eye 19, and immediately opposite the fixed upright 18 a second upright 20 is located upon the revoluble platform, also terminating at its upper end in an eye 21, and this latter upright is connected with the platform by a hinge 22, so that the upright 20 may be dropped to the horizontal position shown in dotted lines in Fig. 3.

A shock-supporting bar 23 has its ends entered in the eyes 19 and 21 of the uprights 18 and 20, and this supporting-bar is provided with a recess in its top at the center to receive a similar recess made in the lower edge of a second supporting-bar 24, which is placed at right angles to and crosses the bar 23. Ropes, cords, or chains 25 are attached to the supporting-bar 23, preferably two at each side of the center, and these ropes or chains are provided with hooks or snaps at their free ends to engage with keepers 26, located on the supporting-bar 24, as shown in Fig. 2, and when the ropes, cords, or chains are suitably fastened they will extend around the point of intersection of the two shock-supporting bars.

A standard 27 is located at the central rear portion of the fixed platform, being suitably braced, and the said standard is carried upward a predetermined distance above the uprights 18 and 20. Upon the upper end of the standard 27 a lift or hoist lever 28 is suitably fulcrumed, provided with a handle at its rear end and at its forward end ordinarily with two ropes, cords, or chains 29, terminating at their lower ends in hooks or snaps 30, adapted to engage with keepers 31, located upon the supporting-bar 24 near its ends.

In the operation of the machine it is drawn forward in the furrow between two rows of corn, cutting the stalks of each row as the machine advances. Ordinarily two attendants stand upon the machine, one near each knife, to receive the stalks as they are cut, and said attendants will stand the stalks against the supporting-bars 23 and 24, where they intersect at the front. When a sufficient quantity of stalks has been thus placed at the front of the revolving platform, the platform is turned around, so as to bring what was formerly the rear to the front, and the stalks are continued to be placed against the intersecting faces of the supporting-bars, and thus brought to the front until a shock of sufficient size has been made. The shock is then tied in any approved manner at a point above the supporting-bars, and the cords or ropes 25 are unfastened and permitted to drop to the position shown in Fig. 3. The upright 20 is then dropped to the horizontal position shown in dotted lines in Fig. 3 and the bar 23, carrying the cords or ropes 25, is drawn from the shock, leaving the other bar 24 in position within the shock, as shown in dotted lines in Fig. 3. The lift-cords 29 from the lift-lever are now connected with the saddle 24, which is in the shock, and the handle end of the lift-lever is depressed, raising the shock from the platform, and the lever is carried around, since it is pivoted on the standard 27, until the shock is brought over the spot where it is desired to stand. The shock is then permitted to drop to the ground. The said shock will drop about a foot or more and will strike the ground with sufficient force to cause the various stalks to assume a suitable position to maintain the shock in an upright position. The hoist-ropes are then disengaged from the supporting-bar 24 and the bar is removed from the shock. The two supporting-bars are then again placed in position on the revolving platform and the machine will be in order for the building up of another shock.

Having thus described my invention, I claim as new and desire to secure by Letters Patent—

1. In a corn-harvester, a platform, uprights secured to the said platform, one of the uprights being fixed and the other capable of dropping from an upright position, a supporting-bar carried by the two uprights, a second supporting-bar crossing the first bar and carried thereby, a hoisting device, and means for connecting the said device with one of the said supporting-bars, as and for the purpose specified.

2. In a corn-harvester, the combination with a platform carrying knives, of a platform mounted to turn and provided with uprights, one of said uprights being connected with the revoluble platform by a hinge so that it can be dropped to a horizontal position, supporting-bars arranged at angles to each other and removably carried by the revoluble platform, binding devices carried by the said supporting-bars, and a lift-lever supported by the frame of the machine and held to turn thereon, the said lift-lever being provided with pendent members adapted to engage with keepers on one of the said supporting-bars, as and for the purpose specified.

3. In a harvester, the combination with a platform mounted to revolve, standards carried by the platform, and a shock-supporting bar connected with the standards, of a second shock-supporting bar arranged approximately at right angles to the bar sustained by the standards and having a loose engagement therewith, the said supporting-bars intersecting at a point above the center of the revoluble platform, binding-cords secured to one of the shock-supporting bars, keepers for the cords carried by the other supporting-bar, and a lifting device for one of the bars, substantially as described.

4. In a harvester, the combination with a wheel-supported platform, knives secured to said platform, a second platform mounted to turn upon the wheel-supported platform, and a fixed and a hinged standard carried by the rotary platform, of a shock-supporting bar sustained by said standards, a second shock-supporting bar having a loose interlocking engagement with the sustained bar, binding-cords connected with one bar, keepers carried by the other bar adapted to receive the loose portions of the cords and a lifting device for the loosely-mounted bar, substantially as described.

FRANK HIXSON.

Witnesses:
S. H. BOFFENMYER,
GEO. A. NICOL.